US011951711B2

(12) United States Patent
Benz et al.

(10) Patent No.: US 11,951,711 B2
(45) Date of Patent: Apr. 9, 2024

(54) DEEP-DRAWABLE FILM

(71) Applicant: AMCOR FLEXIBLES RORSCHACH AG, Rorschach (CH)

(72) Inventors: Patrik Benz, Morschwil (CH); Tony Malfait, Rollegem-Kapelle (BE)

(73) Assignee: AMCOR FLEXIBLES RORSCHACH AG, Rorschach (CH)

( * ) Notice: Subject to any disclaimer, the term of this patent is extended or adjusted under 35 U.S.C. 154(b) by 0 days.

(21) Appl. No.: 16/314,678

(22) PCT Filed: Jul. 4, 2017

(86) PCT No.: PCT/EP2017/025196
§ 371 (c)(1),
(2) Date: Jan. 1, 2019

(87) PCT Pub. No.: WO2018/007025
PCT Pub. Date: Jan. 11, 2018

(65) Prior Publication Data
US 2019/0315097 A1    Oct. 17, 2019

(30) Foreign Application Priority Data
Jul. 4, 2016 (EP) .................................... 16020259

(51) Int. Cl.
*B32B 15/09* (2006.01)
*B32B 7/12* (2006.01)
(Continued)

(52) U.S. Cl.
CPC ................ *B32B 15/09* (2013.01); *B32B 7/12* (2013.01); *B32B 15/085* (2013.01); *B32B 15/20* (2013.01);
(Continued)

(58) Field of Classification Search
CPC ........... B32B 7/12; B32B 15/04; B32B 15/08; B32B 15/085; B32B 15/09; B32B 15/20;
(Continued)

(56) References Cited

U.S. PATENT DOCUMENTS 4,310,578 A * 1/1982 Katsura ................... B32B 15/08
383/108
5,098,751 A * 3/1992 Tamura ................... B32B 15/08
428/35.8
(Continued)

FOREIGN PATENT DOCUMENTS

DE    102005041134 A1    3/2007
EP       0312307 A1    4/1989
(Continued)

OTHER PUBLICATIONS

Machine translation of JP 2015-147309 Sonoda et al. Obtained from JPO. (Year: 2015).*
(Continued)

*Primary Examiner* — Megha M Gaitonde

(57) ABSTRACT

Deep-drawable packaging film (60, 80, 93, 95) having an aluminum foil (10) as a core layer and comprising on an outer side of the aluminum foil (10) a semi-crystalline PET film (21, 25, 50) that is laminated to the aluminum foil (10) using an adhesive layer (40) and comprising on the other side of the aluminum foil (10) opposite to the PET film (21, 25, 50) a sealing layer (30, 35). The PET film (21, 25, 50) has a degree of crystallization between 20 and 70% and has a Young's modulus of 2000 MPa to 2700 MPa. The PET film (21, 25, 50) is a non-stretched film and the inner side of the PET film (21, 25, 50) directed to the aluminum foil (10) comprises a reverse printing (23).

12 Claims, 3 Drawing Sheets

(51) Int. Cl.
*B32B 15/085* (2006.01)
*B32B 15/20* (2006.01)
*B32B 37/12* (2006.01)

(52) U.S. Cl.
CPC .......... *B32B 37/12* (2013.01); *B32B 2255/06* (2013.01); *B32B 2255/26* (2013.01); *B32B 2307/31* (2013.01); *B32B 2307/4026* (2013.01); *B32B 2323/10* (2013.01); *B32B 2553/00* (2013.01)

(58) Field of Classification Search
CPC ........ B32B 27/06; B32B 27/32; B32B 27/36; B32B 2255/06; B32B 2255/26; B32B 2255/10; B32B 2307/31; B32B 2307/4026; B32B 2323/04; B32B 2323/10; B32B 2367/00; B32B 2553/00
USPC .................................................. 428/212, 213
See application file for complete search history.

(56) References Cited

U.S. PATENT DOCUMENTS 6,013,363 A * 1/2000 Takahashi ............... B32B 27/08
156/277
2004/0202828 A1 * 10/2004 Saito ....................... B32B 27/30
428/195.1
2007/0286972 A1 * 12/2007 Kjelgaard ............... B32B 15/08
428/34.2
2009/0117395 A1 * 5/2009 Yakushidoh ............. B32B 7/12
428/458

FOREIGN PATENT DOCUMENTS

| JP | 2015107583 A1 | 6/2015 |
| JP | 2015107586 A | 6/2015 |
| JP | 2015147309 A | 8/2015 |
| WO | 2014208710 A1 | 12/2014 |

OTHER PUBLICATIONS

Written translation of JP 2015-147309 Sonoda et al. (Year: 2015).*
Bonten, Christian. (2019).Plastics Technology—Introduction and Fundamentals—3.19 Polyethylene Terephthalate (PET). (pp. 217-219). Hanser Publishers. Retrieved from https://app.knovel.com/hotlink/pdf/id:kt012379T6/plastics-technology-introduction/polyethylene-terephthalate (Year: 2019).*

* cited by examiner

DEEP-DRAWABLE FILM

The invention relates to a deep-drawable packaging film having an aluminum foil as core layer and comprising on an outer side of the aluminum foil a semi-crystalline PET film having a degree of crystallization between 20 and 70% and having a Young's modulus of 2000 MPa to 2700 MPa that is laminated to the aluminum foil using an adhesive layer, the deep-drawable packaging film further having a sealing layer on the other side of the aluminum foil (10) opposite to the PET film. The invention relates also to a method for manufacturing said deep-drawable packaging film.

The use of capsules with pre-dosed beverage ingredients for e.g. preparing brewed coffee or tea has gained a high popularity due to the convenience of preparation and the constant quality of the delivered beverages. Those capsules provide a storage and brewing volume for the beverage substance such as roast coffee or insoluble tea ingredient. The beverage quality highly depends inter alia on the protection against light, oxygen and humidity of the beverage ingredients by the capsule.

Considering the capsule packaging, a favorite material is aluminum thanks to its ability to provide a full barrier to light, humidity and oxygen, its forming capacity, its piercing properties required for water injection into the capsule and/or extraction of brewed beverage, its mechanical rigidity, its recyclability and manufacturing costs. In contrast hereto, capsules made of polymers alone provide a lower and shorter protection to oxygen, are more difficult to pierce and usually are neither recyclable, nor home compostable.

The outer surface of capsules for preparing brewed coffee or tea is preferably colored or has a printing. Because the outer side of those capsules usually is fluidly associated to the hot water supply of a brewing machine, the color or printing ink has to be suitable for direct food contact and has to comply with the corresponding regulations. Regular packaging inks do not comply with said regulations and consequently direct contact of those inks with the hot water supply must be avoided.

Existing capsules are usually coated with a lacquer on their outside, wherein typically colored epoxy or polyester lacquers are used. Those lacquers are relatively viscous thereby making them non-suitable for delivering a precise thin printed motif or a photo-realistic design. Consequently, only a coarse printing definition is made possible by this way.

Furthermore, aluminum capsules must be deep enough to provide a sufficient volume for storing a required amount of beverage ingredients.

Therefore, there is a need to provide a deep-drawable packaging film sustaining a predefined extension ratio that delivers most of the advantages of aluminum while providing an improved printing ability and a full compliance with the regulations for food packaging. An extension ratio at break of at least 1.2 is required for manufacturing deep-drawn capsules used as containers e.g. for pre-dosed beverage ingredients for brewing hot drinks.

US 2013/0295377 A1 discloses a formable laminate comprising a polyester film and a metal foil for packaging batteries or medical products, wherein the polyester film satisfies certain stress conditions.

EP 0 123 974 B1 discloses a multilayered co-extruded composite film as self-supporting deep drawn film for manufacturing a bottom part of a deep-freeze-resistant vacuum deep-drawn packaging or a vacuum deep-drawn packaging for sharp-edged packaged goods having two external layers which correspond with regard to material and thickness and which comprise linear polyethylene or high-density polyethylene and having two internal layers which correspond with regard to material and thickness and which comprise an ethylene/methacrylic acid copolymer cross-linked with metal ions or an ethylene/vinyl acetate copolymer, in which film the external layers are connected to the internal layers by melt-bonding and the internal layers are connected to one another by blocking.

US 2008/0187695 A1 discloses a package having a printed laminate, wherein the package comprising a first PET film having a reverse printed matter thereon, a second PET film laminated to the first PET film to provide a composite, wherein the printed matter is between the first and second PET films, and a woven bag enclosed by the composite, wherein the second PET film of the composite isolates the printed matter from cross contamination with contents intended for the woven bag.

The prior art documents do not describe a satisfactory solution for providing an aluminum-based, printed packaging film sustaining a predefined extension ratio required for manufacturing deep-drawn capsules used e.g. as containers of pre-dosed beverage ingredients for brewing hot drinks.

The aim of present invention is to provide a deep-drawable and sealable packaging film sustaining a predefined extension ratio and comprising an aluminum foil, wherein the deep-drawable packaging film further has at least on one side a printed or colored appearance that has a full compliance with the regulations for food packaging, wherein the ink or color used must not be compatible with said regulations for food packaging.

According to the present invention there is provided a deep-drawable packaging film having an aluminum foil as core layer and comprising on an outer side of the aluminum foil a semi-crystalline PET film having a degree of crystallization between 20 and 70% and having a Young's modulus of 2000 MPa to 2700 MPa that is laminated to the aluminum foil using an adhesive layer, the deep-drawable packaging film further having a sealing layer on the other side of the aluminum foil (10) opposite to the PET film, wherein the PET film is a non-stretched film and wherein the inner side of the PET film directed to the aluminum foil comprises a reverse printing.

Preferred embodiments of the inventive deep-drawable packaging film are described in the dependent claims.

A semi-crystalline PET film is a film made of or mainly comprising semi-crystalline polyethylene therephthalate (PET). The wording "mainly comprising" means that the semi-crystalline PET film may comprise additives as e.g. anti-blocking agents.

The semi-crystalline PET film is preferably a non-oriented or only slightly oriented cast PET film.

The term "non-stretched PET film" means an essentially non-oriented PET film. Hence, the non-stretched PET film is not exposed to a willful stretching process during or after its production, but the PET film may be slightly oriented due to its manufacturing process resulting after the extrusion casting process. The non-stretched PET film of the inventive deep-drawable packaging film has neither been exposed to a separate stretching process applied after the film production, nor to an in-line stretching process, nor to a tenter or double blown process applied to the PET film after or during its manufacturing process.

In the framework of the investigations it has been found that polymer films exhibiting a strain level equal or above 2 strain % when stressed with 2 MPa measured at 90° C. are especially suitable as an outer film of an inventive deep-drawable packaging film sustaining an extension ratio at break of at least 1.2.

Consequently, In the context of present invention, the non-stretched polymer film may also be defined as polymer film exhibiting a strain level equal or above 2% when stressed with 2 MPa at 90° C. as presented in FIG. 6 showing that only strain-stress curves of un-oriented films fulfill this criterion.

The investigations performed with polymer films having a degree of crystallization between 20 and 70% and a Young's modulus of 2000 MPa to 2700 MPa further showed surprisingly that only a non-oriented or non-stretched PET film exhibits an adequate barrier against the migration of ink particles while exhibiting the required deep draw properties.

The semi-crystalline PET film may be pigmented or unpigmented. The PET film is either a reverse printed unpigmented or pigmented single layer PET film or a coextruded multilayer PET film having an inner reverse printed pigmented polymer layer and an outer unpigmented polymer layer. In case of a coextruded multilayer PET film the printing is deposited onto the pigmented polymer layer and is directed to the adhesive layer located between the coextruded PET film and the aluminum foil.

The deep-drawable packaging film comprises on the side of the aluminum foil lying opposite to the semi-crystalline PET film a sealing layer that may either be a sealing lacquer, or a film made of polypropylene that is laminated to the aluminum foil using an adhesive layer. The sealing layer, i.e. the sealing lacquer or the polypropylene film, may be pigmented or unpigmented.

The deep-drawable packaging film not only sustains a certain extension ratio, but also allows sustaining a forming process, especially a deep drawing process, without forming cracks in the PET film. For this reason, the PET film preferably has a tensile stress at break between 40 to 55 MPa. The extension ratio is the ratio between the final length of a film strip and its initial length.

The PET film is a functional barrier layer preventing the migration of ink particles or its components to the outer free surface of the PET film, i.e. the surface of the semi-crystalline PET film lying opposite to the aluminum foil. If the PET film is pigmented, the pigments are dispersed into the polymer, or only an inner layer of the PET film is pigmented and an outer layer of the PET film is free of any pigments. The distribution of the pigments may be homogeneous or may vary over the PET film or the pigmented layer. The PET film or at least an outer layer of the PET film complies with the European regulation EC10/2011 on "plastic materials and articles intended to come into contact with food".

The degree of crystallization defines the quantity of crystallized polymer in respect of the total quantity of polymer and ranges preferably from 20 to 40% and lies especially preferred between 23 and 30%.

The degree of crystallization is measured by differential scanning calorimetry (DSC) according to DIN EN ISO 11357-3:2013-4. The glass transition temperature $T_g$ and the melting temperature $T_m$ of a semi-crystalline, 25 µm thick PET film have been determined by DSC, wherein $T_g$ is 74° C. and $T_m$ is 249° C. for a PET film having a degree of crystallization of 26.7%. The crystal size is typically in the order of 10 to 20 nm.

The PET film may be formed of a single polymer layer or of two or more layers made of the same polymer material. The non-oriented PET film is required in order to reduce the risk of cracks during a subsequent forming process.

In a preferred embodiment, the PET film consists of an inner pigmented and reverse printed PET film layer and an outer translucid PET film layer. Both PET film layers are semi-crystalline. The ink layer is arranged between the inner pigmented polymer layer and the aluminum foil. This allows the production of a deep-drawable packaging film having an outer colored appearance with a printing. A PET film comprising a pigmented and an unpigmented PET film layer is manufactured by coextrusion of the two semi-crystalline PET film layers.

The Young's modulus of the semi-crystalline PET film preferably lies between 2100 MPa and 2300 MPa. The Young's modulus defines the relationship between stress and strain in the PET film within the elastic deformation region according to Hooke's law.

The semi-crystalline PET film may comprise 0.1 to 1.5 weight-% of an anti-blocking agent. The antiblocking agent may be organic or inorganic. Inorganic antiblocking agents for present application include $SiO_2$, magnesium silicate, $CaCO_3$, alumina-silicate ceramic, aluminum silicate and aluminum potassium silicate. Organic antiblocking agents may comprise ethylene bisstearamide (EBS), stearyl erucamide, stearamide, glycerol monostearate (GMS), Zinc stearate, silicone or PTFE. Antiblocking agents decrease the adhesion of adjacent films.

The PET film has a preferred thickness of 8 to 40 µm, in particular 15 to 35 µm. Said thickness range allows the PET film to provide an effective barrier to the migration of ink and provides an adequate protection of the printing against scratching and abrasion.

The unprinted and unpigmented PET film is preferably translucid, which means in the sense of present invention that it lets pass at least 95% of the incident light. This ensures that the inner printed ink layer is well visible from the outside.

The sealing layer acts on the one hand as a protective layer against direct contact of a packaged content with the aluminum foil and on the other hand provides the ability of the packaging film to be sealed to itself or another film or foil. The sealing layer may be pigmented or unpigmented.

The sealing layer may be made of a pigmented or unpigmented heat seal lacquer or may consist of a polypropylene (PP) film glued to the aluminum foil by an intermediate laminating adhesive layer. If a heat seal lacquer is applied, it has preferably a mass per square meter of 5 to 15 $g/m^2$, in particular 8 to 12 $g/m^2$. In case the sealing layer consists of a film made of PP laminated to the one side of the aluminum foil, the PP film has a preferred thickness of between 25 µm to 35 µm, in particular 28 µm to 32 µm.

The adhesive layer used either for laminating the reverse printed polymer layer and/or the sealing layer made of PP to the aluminum foil preferably has a mass per square meter of 3 $g/m^2$ to 8 $g/m^2$, notably 4.5 $g/m^2$ to 6 $g/m^2$. The laminating adhesive layer between the aluminum foil and the reverse printed PET film preferably is a continuous adhesive layer covering the whole interface between the PET film and the aluminum foil. The laminating adhesive is preferably a solvent based adhesive and is especially preferred a polyurethane based adhesive.

The aluminum foil consists preferably of a soft annealed aluminum foil made of a AA8011A alloy. A preferred thickness of the aluminum foil is between 80 and 120 µm. The tensile strength of the aluminum foil preferably lies within 90 to 120 MPa and has an elongation at break of between 16 to 36%.

The aluminum foil provides a good rigidity, formability and gas barrier characteristics required for food packages made out of the inventive deep-drawable packing film.

Another aspect of the invention concerns the provision of a method for manufacturing a flat, deep-drawable packaging film according to the invention. This method includes providing an aluminum foil, a semi-crystalline and non-stretched PET film, adhesives and a sealing lacquer or a polypropylene film, the PET film is then provided with a reverse printing, wherein the PET film has a degree of crystallization between 20 to 70% and has a Young's modulus of 2000 MPa to 2700 MPa, wherein at least one side of the aluminum foil or the reverse printed side of the PET film is coated with the adhesive, the reverse printed side of the PET film is then laminated to the aluminum foil using the adhesive layer and the surface of the aluminum foil opposite to the semi-crystalline PET film is either coated with the heat seal lacquer, or the film made of polypropylene (PP) is laminated to said aluminum surface using the adhesive. Said deep-drawable packaging film is especially suitable for manufacturing cup-shaped capsules for packaging food or pharma products.

The application of the printing onto the semi-crystalline PET film is preferably made by digital printing, rotogravure printing or flexo printing. This allows a precise printing of motifs by ink dots. Furthermore, ink dots of different colors may be applied side-by-side in order to produce colored motifs by superimposing different colored dots. The ink dots have a preferred size of 20 to 80 μm, in particular 20 to 60 μm. Said definition enables the production of very sharp and contrasted motifs and/or lettering.

Because the deep-drawable packing film is usually deformed when manufacturing a package, the printing is preferably distortion corrected relative to a subsequent deforming process, in particular relative to a deep-drawing process.

The distortion correction is preferably done in a partially automated way, i.e. the graphics to be applied on the PET film are pre-distorted by a known computer program to compensate for the distortion that occurs during the forming, especially the deep-drawing process. The calculated pre-distortion function is then modified manually by the user to provide the desired results, or the pre-distortion method may use one or more parameters such that the user can change properties of the pre-distortion by changing one or more of the parameters.

A semi-crystalline PET film may be manufactured by first drying a PET granulate at a temperature of 150° C. to 170° C., melting the dried PET granulate comprising if necessary an anti-blocking agent and/or pigments in a barrel and mixing the melt to get a homogeneous temperature of between 280 and 290° C. and screw extruding the melt at a constant pressure of between 35 and 45 bar, wherein the melt is casted through a die and the extruded product is then cooled by passing it through chill rolls at a film speed of between 30 to 50 m/min and the chill rolls having a temperature of between 5 to 50° C.

The inventive deep-drawable film may be used as packaging film having a distortion corrected printing for manufacturing a cup-shaped container out of the flat inventive packaging film, especially a container having a depth-to-width ratio of at least 0.3, wherein the PET film constitutes the outer layer of the capsule.

The cup-shaped capsules are usually closed after filling the ingredients into the cup-shaped capsule or container by sealing a lid on the rim of the open capsule or container. The lid may consist of a blank or lacquered aluminum foil and/or may consist of or may comprise a plastic layer. The outer side of said lids may comprise embossments or the lid may comprise a reverse or surface printed outer film.

Cup-shaped capsules manufactured out of the deep-drawable packaging film according to the invention are especially suitable for food or pharma packaging applications.

The inventive deep-drawable film may be used for manufacturing self-standing packages that confer a defined shape upon forming.

The extension ratio of the deep-drawable laminate preferably is at least 1.6. The cup-shaped capsule or container preferably has a depth-to-width ratio of between 0.5 and 1.2.

When roast and ground coffee is the main beverage ingredient of a cup-shaped capsule, the aluminum protects the coffee against oxidation at ambient atmosphere and prevents carbon gas of coffee from escaping out of a sealed capsule.

The invention will now be described by way of examples and with reference to the accompanying drawings in which:

FIG. 4 shows a schematic cross section through a fourth embodiment of an inventive packaging film.

Figure 1:
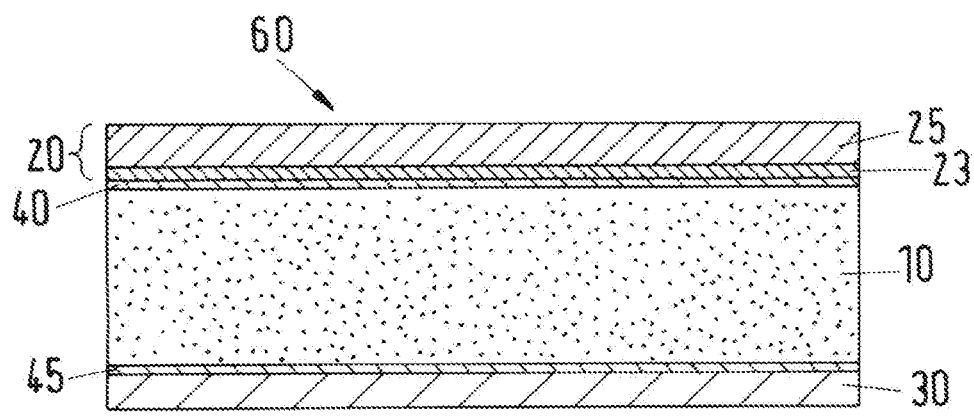
FIG. 1 shows schematically a cross section through an inventive packaging film.

FIG. 1 shows schematically an example of an inventive deep-drawable packaging film 60 comprising an aluminum foil 10 as a middle layer. A reverse printed polymer layer 20 is laminated to one side of the aluminum foil 10 using an adhesive layer 40. The reverse printed PET film 20 consists of a semi-crystalline PET film 25 and an ink layer 23 printed onto the PET film 25. The printing may be distortion corrected relative to a subsequent deep-drawing process. The PET film 25 functions as barrier layer that prevents migration of ink to the outer, free surface of the PET film. The ink layer 23 forms the interface between the PET film 25 and the adhesive layer 40. The other side of the aluminum foil 10 opposite to the reverse printed PET film 20 comprises a sealing layer or sealing film 30 made of a polypropylene that is laminated to the aluminum foil 10 using a laminating adhesive layer 45.

Figure 2:
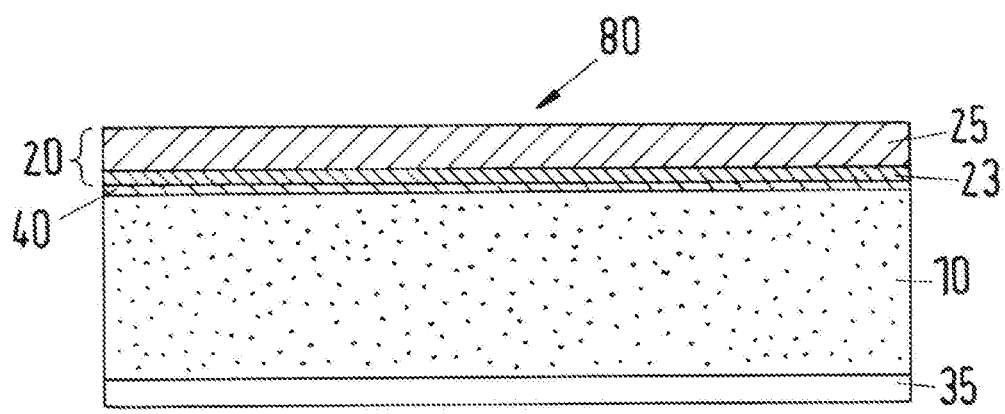
FIG. 2 shows schematically a cross section through a second embodiment of an inventive packaging film.

FIG. 2 shows a schematic cross section through a deep-drawable packaging film 80 having an aluminum foil 10 as a middle or core layer and on one side of the aluminum layer a reverse printed PET film 20 laminated to the aluminum foil 10 using an adhesive layer 40. The reverse printed PET film 20 consists again of a semi-crystalline PET film 25 and an ink layer 23 printed onto the PET film 25, wherein the PET film 25 functions as barrier layer that prevents migration of ink to the outer, free surface of the PET film. The ink layer 23 forms the interface between the semi-crystalline PET film 25 and the laminating adhesive layer 40. The other side of the aluminum foil opposite to the reverse printed PET film 20 is coated with a layer of a heat seal lacquer 35, wherein preferably no adhesion layer is applied, i.e. the heat seal lacquer is directly applied to the one aluminum surface. The heat seal lacquer may be colored, i.e. may comprise pigments, or may be transparent or opaque without comprising any additional pigments.

Figure 3:
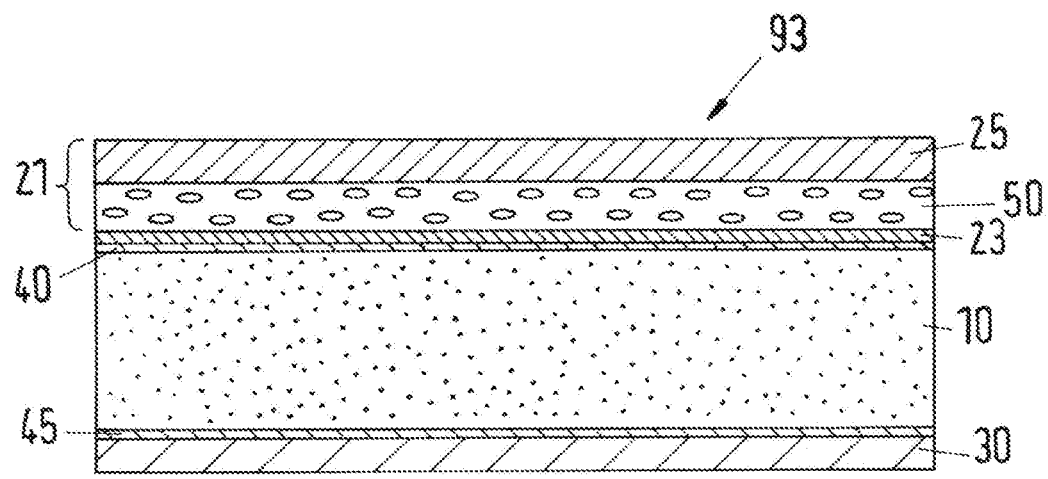

FIG. 3 shows schematically a cross section of another example of an inventive deep-drawable packaging film 93 comprising again an aluminum foil 10 as a middle or core layer and comprising on one side of the aluminum foil 10 a PET film 21 consisting of two layers, namely an inner pigmented semi-crystalline PET film layer 50 and an outer transparent or semi-transparent semi-crystalline PET film layer 25. The inner pigmented and the outer transparent or semi-transparent polymer layers are preferably coextruded polymer layers 25, 50 and together form the semi-crystalline PET film 21. The inner pigmented layer 50 comprises a reverse printing represented as ink layer 23. The ink layer 23 of the reverse printed pigmented PET film layer 50 is arranged between the inner pigmented polymer layer 50 and the aluminum foil 10 or more precisely between the inner polymer layer 50 and the laminating adhesive layer 40, because the PET film 21 is laminated to the aluminum foil 10 using a laminating adhesive layer 40. The outer PET film 25 is translucent and functions as barrier layer that prevents migration of ink to the outer, free surface of the outer PET film 25. The pigmented PET film 50 is reverse printed after coextruding the pigmented and unpigmented polymer layers 25, 50 and before laminating the coextruded and reverse printed PET film 21 to the aluminum foil 10. The other side of the aluminum foil 10 opposite to the PET film 21 comprises a sealing layer made of a polypropylene film 30 that is laminated to the aluminum foil 10 using a further adhesive layer 45.

Figure 4:
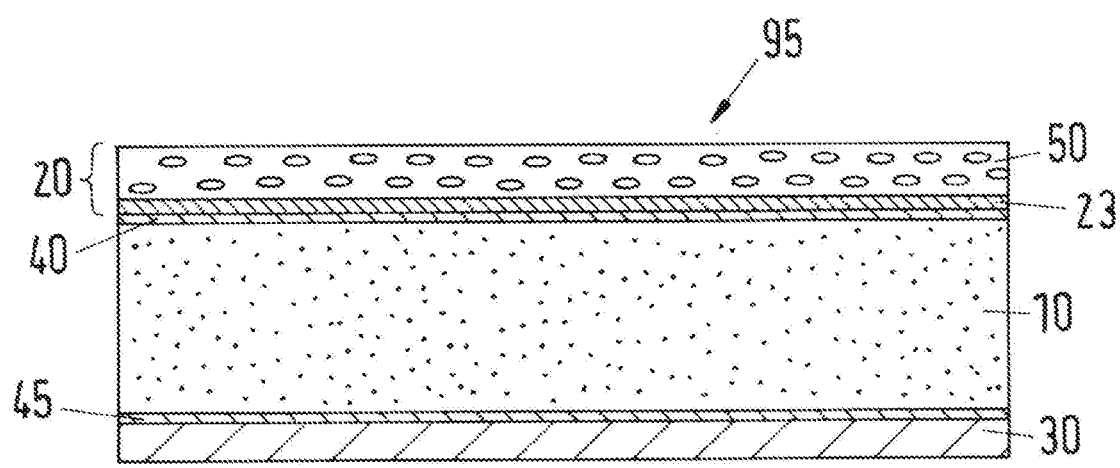
FIG. 4 shows a schematic cross section through a third embodiment of an inventive packaging film.

FIG. 4 shows schematically a cross section of a further inventive deep-drawable packaging film 95 having a similar structure as that shown in FIG. 3 except that there is only a reverse printed semi-crystalline pigmented film 20 comprising a pigmented semi-crystalline PET film 50 and an inner ink layer 23. The pigmented PET film 50 is partially translucid and comprises a reverse printing 23 on its inner surface directed to the aluminum foil 10. The PET film 20 is again laminated to the aluminum foil 10 using an adhesive layer 40. The other side of the aluminum foil 10 opposite to the PET film 20 comprises a sealing layer made of a polypropylene film 30 that is laminated to the aluminum foil 10 using an adhesive layer 45.

Figure 5:
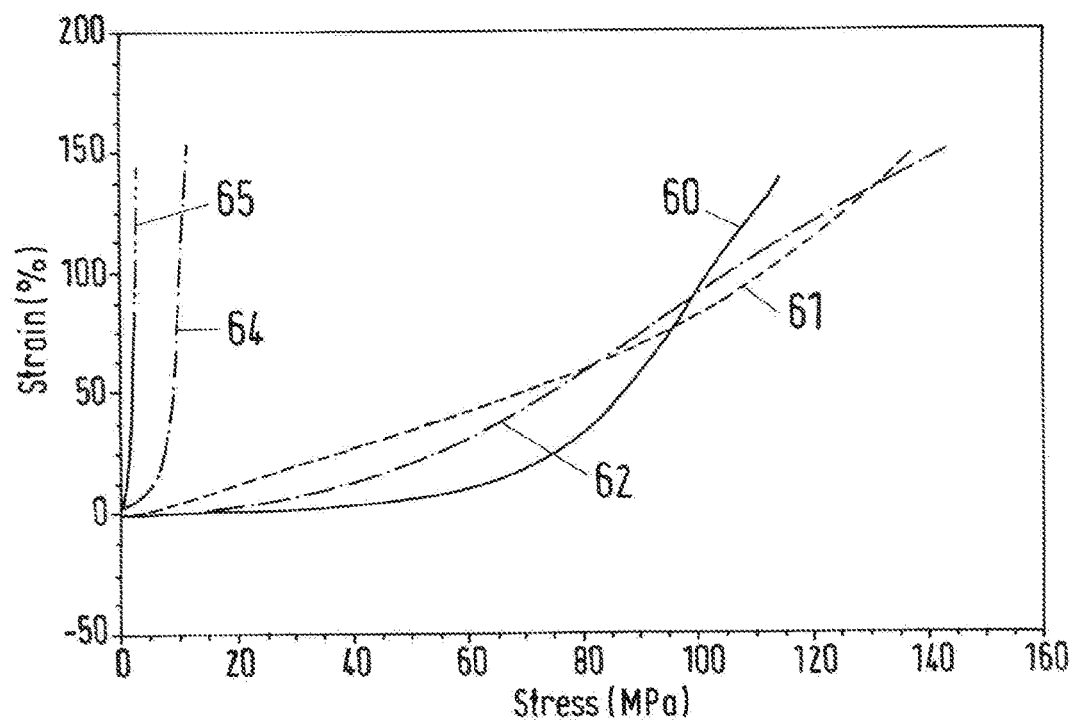
FIG. 5 shows the comparison of deformation properties of oriented and non-oriented PET films.
Figure 6:
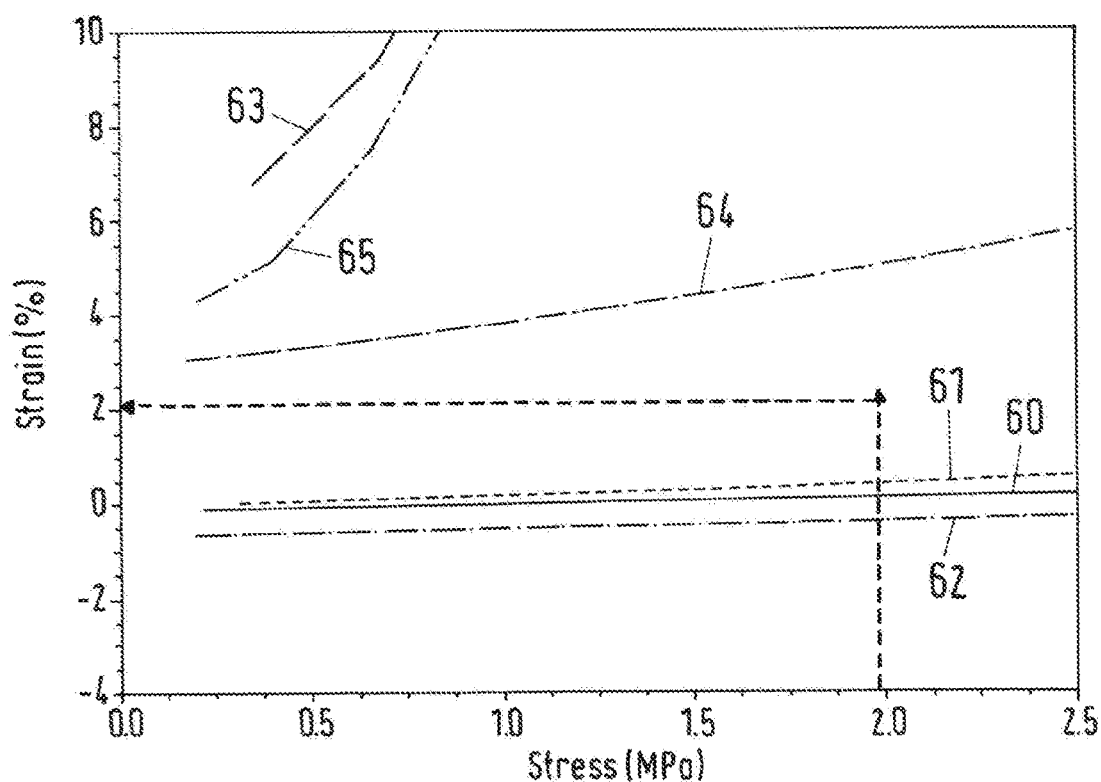
FIG. 6 shows enlarged graphs presented in FIG. 5 in a low stress range.

Comparison of deformation properties of oriented and non-oriented PET films are shown in FIGS. 5 and 6.

FIG. 5 shows the relationship between the stress and strain for different polymers in the form of strain-stress curves. FIG. 6 shows enlarged graphs at low stress ranges of the same polymers as presented in FIG. 5. Each curve is unique for each material and is found by recording the amount of strain at distinct intervals of tensile loading (stress).

Those strain-stress curves of various polymers vary widely, and different tensile tests conducted on the same material yield different results, depending upon the temperature of the specimen and the speed of the loading.

The diagrams shown in FIGS. 5 and 6 indicate on their abscissa the applied strain in MPa and on the ordinate the resulting strain in %.

Strain curves at 90° C. have been measured with a Controlled Stress TA Instruments Q800 Dynamic Mechanical Analyser (DMA). Samples of 10 mm length and 5 mm width were clamped in machine direction with a preload force of 0.025 N. After an equilibrium time of 5 min a steady force increase of 1 N/min was applied on the sample till breakage and the resulting strain % was recorded.

One sample tested with DMA consisted of biaxially oriented PET 60, wherein PXE grade from Nuroll S.p.a. was applied as reference. Another sample was made of biaxially oriented PP 61 (Bicor MB400 was obtained from Jindal). A further sample was made of biaxially oriented nylon-6 film 62 on BXB that was obtained from Domo.

An unoriented sample tested with DMA was a cast extruded amorphous PETG film 63 that has been produced in a cast process using co-polyester resin Eastar 6763 from Eastman. A further sample was made of an unoriented PBT film 64 that was produced using Ultradur B4500 FC from BASF. Another sample of an unoriented PET film 65, type SPC PET was obtained from Propyplast and has tested with DMA.

The application of a stress on the film samples described above at a pre-defined temperature under lab conditions as described above and resulting in a deformation (strain %) simulates the industrial deep-draw process. In particular, it allows the relative comparison of materials in terms of easiness to deform. Actually, the resulting strain % as a function of the applied stress is indicative for the so-called material compliance. The above tests show that oriented films have a significantly larger resistance to a deformation stress in the longitudinal direction. The curves for the oriented films, and in particular oriented PET, is flat in the low stress region. In other words, the oriented films have a near to zero compliance in contrast to non-oriented PET. Industrial deep-drawing of an oriented PET would require much higher forces compared to an un-oriented one and results in breakage or splitting.

A threshold criterion has been defined and it has been found that the resulting strain % at a low stress level applied at 90° C. in the described DMA-test is indicative for the deep-drawing properties of the outside PET film 21, 25, 50. Films measured under these circumstances exhibiting a strain level equal or above 2%, resulting from 2 MPa stress, are especially suitable for the application in inventive deep-drawable packaging films (see dotted bold lines in FIG. 6). Summary results are given in Table 1.

TABLE 1

|  | % strain @ 2 MPa, 90° C. |
|---|---|
| OPET | 0.08 |
| OPA | 0.02 |
| OPP | 0.39 |
| PETG | 51 |
| PBT | 5.0 |
| PET | 44 |

From the non-oriented polymers fulfilling the criterion of exhibiting a strain level equal or above 2% resulting from 2 MPa stress at 90° C. and having a degree of crystallization between 20 to 70% and a Young's modulus of 2000 MPa to 2700 MPa only PET films show adequate migration inhibition barrier properties for ink components.

PET and PBT as 31 μm thick films act as functional barrier for migrants with a molar mass between 100 and 250 g/mol in test conditions 40° C. during 10 days. As reference for comparison, under the same conditions, for identical migrants with molar mass between 100 and 250 g/mol LDPE has no functional barrier and a PP film would require a thickness of 3900 μm.

If we consider the largest molar mass migrants (751-1500 g/mol) with no toxicological effects upon migration, then already a Aim PET film provides a functional barrier at 40° C. during 10 days. As reference for comparison, under the same conditions, for identical migrants with molar mass between 751 and 1500 g/mol LDPE requires 1000 μm thickness and a PP film would require a thickness of 220 μm.

The invention claimed is:

1. Deep-drawable packaging film suitable for brewing hot drinks and in full compliance with regulations for food packaging, having an aluminum foil as core layer and comprising on an outer side of the aluminum foil a coextruded multilayered film having a first layer of a transparent or semi-transparent, semi-crystalline PET film having a degree of crystallization between 20 and 70% and having a Young's modulus of 2000 MPa to 2700 MPa, a second layer of a pigmented semi-crystalline PET film, the coextruded multilayer film being unstretched; and, a third layer of ink is applied to the coextruded multilayered film on the second layer, wherein the ink is not suitable for direct food contact, the coextruded multilayered film providing a barrier to the migration of ink therethrough and is laminated to the aluminum foil using an adhesive layer, and the deep-drawable packaging film further having a sealing layer on the other side of the aluminum foil opposite to the coextruded multilayered film.

2. Deep-drawable packaging film according to claim 1, wherein the coextruded multilayer film exhibits a strain level equal or above 2 strain % when stressed with 2 MPa at 90° C.

3. Deep-drawable packaging film according to claim 1, wherein the degree of crystallization of the coextruded multilayer film is between 20 and 40%.

4. Deep-drawable packaging film according to claim 1, wherein the Young's modulus of the coextruded multilayer film is between 2100 MPa and 2300 MPa.

5. Deep-drawable packaging film according to claim 1, wherein the coextruded multilayer film has a thickness of 8 to 40 μm.

6. Deep-drawable packaging film according to claim 1, wherein the sealing layer consists of a heat seal lacquer preferably having a mass per square meter of 5 to 15 g/m².

7. Deep-drawable packaging film according to claim 1, wherein the sealing layer consists of a film made of polypropylene that is glued to the aluminum foil by an intermediate adhesive layer.

8. Deep-drawable packaging film according to claim 7, wherein the polypropylene film has a thickness of between 25 μm to 35 μm.

9. Deep-drawable packaging film according to claim 1, wherein the adhesive layer has a mass per square meter of 3 g/m² to 8 g/m².

10. Deep-drawable packaging film according to claim 1, wherein the aluminum foil is a soft annealed aluminum foil made of an AA8011A alloy having a thickness of between 80 to 120 μm.

11. Method for manufacturing a flat, deep-drawable packaging film according to claim 1 for manufacturing cup-shaped capsules for packaging food or pharma products, wherein an aluminum foil, a coextruded multilayer film having a first layer and a second layer of a semi-crystalline PET that is non-stretched, adhesives and a sealing lacquer or a polypropylene film are provided and the coextruded multilayer film is provided with a reverse printing, wherein the coextruded multilayer film has a degree of crystallization between 20 to 70% and has a Young's modulus of 2000 MPa to 2700 MPa, at least one side of the aluminum foil or the reverse printed side of the coextruded multilayer film-is coated with the adhesive, the reverse printed side of the coextruded multilayer film is then laminated to the aluminum foil by the adhesive layer and the surface of the aluminum foil opposite to the coextruded multilayer film is either coated with the heat seal lacquer, or the film made of polypropylene is laminated to said aluminum surface using the adhesive.

12. Method according to claim 11, wherein the printing is distortion corrected relative to a subsequent deep-drawing process.

* * * * *